United States Patent [19]
Shearer, Jr.

[11] Patent Number: 5,927,465
[45] Date of Patent: *Jul. 27, 1999

[54] CONVEYOR SORTATION SYSTEM WITH PARALLEL DIVERT

[75] Inventor: James T. Shearer, Jr., Ada, Mich.

[73] Assignee: Mannesmann Dematic Rapistan Corp., Grand Rapids, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/943,422

[22] Filed: Oct. 3, 1997

Related U.S. Application Data

[60] Provisional application No. 60/028,012, Oct. 8, 1996.

[51] Int. Cl.$^6$ .............................. B65G 47/10; B65G 47/24
[52] U.S. Cl. .................... 198/370.02; 198/890; 198/412; 198/415
[58] Field of Search ............................... 198/890, 370.02, 198/890.1, 367.1, 723, 364, 717, 412, 415

[56] References Cited

U.S. PATENT DOCUMENTS

| | | |
|---|---|---|
| 2,868,394 | 1/1959 | Greller et al. . |
| 2,984,366 | 5/1961 | Greller . |
| 3,361,247 | 1/1968 | Lauzon et al. . |
| 3,384,237 | 5/1968 | Leonard . |
| 3,710,923 | 1/1973 | Fromme et al. . |
| 3,771,648 | 11/1973 | Revuelta . |
| 4,214,663 | 7/1980 | Schopp et al. . |
| 4,487,308 | 12/1984 | Focke et al. ............................. 198/412 |
| 4,501,365 | 2/1985 | Peyton et al. . |
| 4,711,341 | 12/1987 | Yu et al. . |
| 4,738,347 | 4/1988 | Brouwer et al. . |
| 4,884,677 | 12/1989 | Yu et al. .......................... 198/370.02 X |
| 4,896,760 | 1/1990 | Trantafilou et al. ........... 198/370.02 X |
| 5,038,912 | 8/1991 | Cotter . |
| 5,165,515 | 11/1992 | Nitschke et al. . |
| 5,664,661 | 9/1997 | Maier ...................................... 198/412 |

FOREIGN PATENT DOCUMENTS

| | | |
|---|---|---|
| 0506494B1 | 8/1996 | European Pat. Off. . |
| 2745298 | 11/1978 | Germany . |
| 55-16933 | 5/1980 | Japan . |
| 1317914 | 12/1989 | Japan . |

Primary Examiner—William E. Terrell
Assistant Examiner—K W Bower
Attorney, Agent, or Firm—Van Dyke, Gardner, Linn & Burkhart, LLP

[57] ABSTRACT

A conveyor diverting system having an endless conveying surface and diverting shoes transversely movable across the conveying surface for diverting articles having an upstream and a downstream diverting track where the upstream diverting track is oriented parallel to the downstream diverting track for a portion of its length, and converges with the downstream diverting track along its other portion. The conveyor system further includes a controller which utilizes only the downstream diverting track if the article to be diverted is less than a first predetermined length or greater than a second predetermined length. If the article to be diverted is between the first predetermined length and the second predetermined length, then both diverting tracks are utilized.

31 Claims, 10 Drawing Sheets

CONVEYOR SORTATION SYSTEM WITH PARALLEL DIVERT

This application claims priority to U.S. Provisional Patent Application, Ser. No. 60/028,012, filed Oct. 8, 1996.

BACKGROUND OF THE INVENTION

This invention relates generally to conveyor diverting systems, and, more particularly, to conveyor diverting systems having an endless conveying surface composed of multiple surface members, each one or group of adjacent ones mounted with a laterally movable shoe capable of diverting articles from the conveyor by pushing laterally against the articles as they move down the conveyor. Such lateral pushing thereby diverts a package, such as from the main conveyor to an adjacent branch conveyor, or other receiving structure.

Article diverters using a moving conveying surface consisting of a plurality of parallel surface members mounted to endless chains have been known for a number of years. Such diverters utilize a diverter shoe movably mounted on each surface member for lateral movement with respect to the conveying surface under the guidance of a track network. The track network is located generally under the conveying surface and guides the diverter shoes via pins which descend from the diverter shoes and engage the track network. Diverting gates in the track network selectively transfer guidance of each diverter shoe from a track running in the direction of the movement of the conveying surface to a diagonal track, or plurality of diagonal tracks, in order to cause lateral movement of the diverter shoes. In order to avoid wasted spacing between variable-length packages, such diverters may include manual or automatic measuring means at an infeed point to cause the diverter gate associated with the selected branch conveyor to divert a selected number of shoes corresponding in general to the length of the package. Exemplary of this type of conveyor are U.S. Pat. No. 3,361,247, issued to James N. Lauzon et al. and U.S. Pat. No. 4,738,347, issued to Brouwer and commonly assigned with the present invention.

With increased demands for the number of packages to be conveyed by such conveying systems, the inter-package spacing distance has become a critical factor in the design of conveying systems. Decreasing the spacing between packages on the conveyor allows a greater throughput of packages by the conveyor. Conversely, providing more space between the packages results in a diminished efficiency and throughput.

Prior diverting systems have addressed the problem of reducing the inter-package spacing requirements. U.S. Pat. No. 5,038,912, issued to David Cotter and commonly assigned with the present application discloses a single diagonal diverting track that is located underneath the conveying surface and is oriented at an angle to the main conveyor and generally points in the direction of the branch conveyor. As packages move down the conveyor, sensors are used to determine the length of the package. When the package reaches the diverting area, a gate is activated which channels the guide pins of the diverting shoes to an alternate path defined by the diagonal diverting track. The diverting gate remains activated to sequentially divert so many diverting shoes as are necessary, based on the measured package length, to successfully push the package off the main conveyor and onto the branch conveyor. After enough diverting shoes have been diverted, the diverting gate is deactivated, and subsequent diverting shoes proceed along one side of the conveyor where they do not divert the adjacent traveling packages.

A specific minimum inter-package spacing is required in this system as a result of the rotation of the diverted package as it is initially diverted. Because of this rotation, additional inter-package spacing is required to avoid conflict between the diverting package and a closely trailing package. This rotation pushes the trailing corner of the package adjacent the branch conveyor back a distance, which can be estimated using the width (W) of the package and the acute angle ($\theta$) which is formed by the intersection of the main conveyor and the branch conveyor. Using these two variables and assuming that the package rotates about the trailing corner opposite the branch conveyors, it will be observed that:

$$A = W \sin \theta$$

where A is the distance the trailing corner adjacent the branch conveyor is pushed back by the package's rotation. It is, therefore, necessary with this system that packages to be diverted are not spaced closer together than the distance $W \sin \theta$.

By way of example, if a diverting branch is oriented at about 20° with packages 16 inches in width, an inter package distance of approximately 5.5 inches is necessary. If the package is 24 inches long, this results in the need for approximately 23% more empty space on the conveyor. A hypothetical system that could divert packages without any significant space between packages could thus produce a 23% increase in package throughput without any increase in conveyor speed. The high desirability of such a system is thus clear.

Another method of diverting packages known, which reduces the required inter-package spacing, is described in commonly assigned U.S. Pat. No. 5,165,515, issued to Michael L. Nitschke et al., which is commonly assigned with the present application. This system increases throughput by not rotating the diverted packages. This non-rotation is accomplished by using a plurality of generally parallel diverting tracks oriented diagonally with respect to the direction of conveyor movement, instead of a single diverting track. Each track has its own diverting gate which is actuated to divert the movement of the diverting shoes from the direction of the conveyor to the lateral diverting direction. By simultaneously activating more than a single diverting gate, a group of diverting shoes corresponding to the measured package length can be moved laterally across the conveyor surface. This group of shoes acts along nearly the entire length of the package to be diverted and, therefore, causes no rotation of the package. Without rotation of the package, the inter-package spacing requirement is reduced to a minimum.

However, this technique is not without difficulties. The deliberate non-rotation of the packages means the packages will enter the branch conveyor still aligned parallel to the main conveyor, but oriented generally diagonally with respect to the branch conveyor (i.e., their lengthwise sides are not parallel to the direction of motion of the branch conveyor). This orientation significantly increases the necessary width of the branch conveyors, resulting in an increase in cost and a reduction in the spacing on branch conveyors. Another difficulty with this method is that it requires an array of diverting gates and associated diverting tracks which must be duplicated for each divert point which adds cost to the diverting system.

It will thus be observed that there exists a need for a conveyor diverting system that can divert packages with little or no inter-package spacing and ensure that packages diverted to the branch conveyor are properly aligned, all while keeping costs to a minimum.

SUMMARY OF THE INVENTION

The present invention provides a sortation conveyor which achieves efficiency gains through reduction of the inter-package spacing. These efficiency gains are especially desirable because they can be achieved without the extra power consumption, noise, and wear that results from increasing the conveyor speed. The present invention increases conveyor diverting system throughput by utilizing a pair of diverting tracks and diverting gates which are structured and controlled in a manner which provides the benefits of an array of diverting tracks with reduced cost and improved performance.

According to one aspect of the invention, the sequence and content of decisions made by an automatic controller overseeing the operation of the diverting gates determine which diverting gates are to be activated and for how long depending upon the measured length of the packages on the conveyor. Sensors positioned along a point upstream of the diverting area provide data which is sent to the controller and interpreted to determine the length of the package. The controller compares the length of the package with a preset distance. Packages having a length less than this preset distance are diverted using one diverting gate. As many diverting shoes as is necessary to divert the package are allowed to be diverted through this single open gate. Packages having a length greater than this preset distance, but less than a second predetermined distance, are diverted using both diverting gates. Only a single diverting shoe is diverted through each gate in this situation. Packages having a length greater than this second predetermined distance are diverted using only a single diverting gate. As many diverting shoes as are necessary to divert the package are allowed to pass through this single open gate. This aspect of the invention achieves many of the benefits of the parallel divert technique disclosed in Nitschke et al. '515 at a much reduced cost and complexity.

According to another aspect of the present invention, a pair of diverting tracks (an upstream and a downstream track) that engage the guide pins of the diverting shoes are constructed so that they extend diagonally across and underneath the conveying surface. At least two pushers diverted to the diverting tracks will initially divert a package parallel to the direction of travel. However, the package will be rotated as it is diverted further toward the branch conveyor. This may be accomplished by the diverting tracks converging in the direction of the branch conveyor. The downstream diverting track may be straight for its entire length, while the upstream track may be straight for only a portion of its length, and curved on the remaining portion. In such embodiment, the straight portion runs generally parallel with the downstream track, while the curved portion begins near the middle of the upstream track and curves in such a manner that it converges with the downstream track. Alternatively, the upstream diverting track may be bent at an angle so that one portion is parallel to the downstream diverting track, and the other portion meets with the downstream diverting track. In yet another embodiment, the upstream diverting track may terminate at or near the middle of the conveying surface.

When a package is to be diverted, a pair of diverting shoes are diverted from the guide track to the diverting tracks, with one traveling along the upstream diverting track and the other traveling along the downstream diverting track. While the upstream diverting shoe is traveling along the straight portion of the upstream diverting track, both diverting shoes are longitudinally aligned with each other and act to push on the package uniformly and non-rotationally. After the upstream diverting shoe passes the transition point, the curved upstream diverting track causes the upstream diverting shoe to no longer act in alignment with the downstream diverting shoe. This results in a rotational force being applied to the package. This rotational force continues to be applied until the package is properly re-oriented for traveling on the branch conveyor.

The straight portion of the upstream diverting track therefore serves to delay the re-orientation of the package until after it has been partially pushed across the conveyor. By delaying the reorientation step, the package causes less interference with trailing packages when it is reoriented. Indeed, the amount of interference is dependent upon two variables other than the inter-package spacing: (1) the length of the delay and (2) the width of the trailing package. The more reorientation is delayed, the less interference there is with trailing packages. When a package is reoriented, it is the upper trailing corner of the package that swings into the trailing package. With a trailing package of smaller width, the re-orientation delay can permit the package to be pushed into a new position prior to reorientation that does not interfere with the trailing package when reoriented.

These and other objects, advantages, and features of this invention will become apparent upon review of the following specification in conjunction with the drawings.

DESCRIPTION OF THE PREFERRED EMBODIMENT

Figure 1:
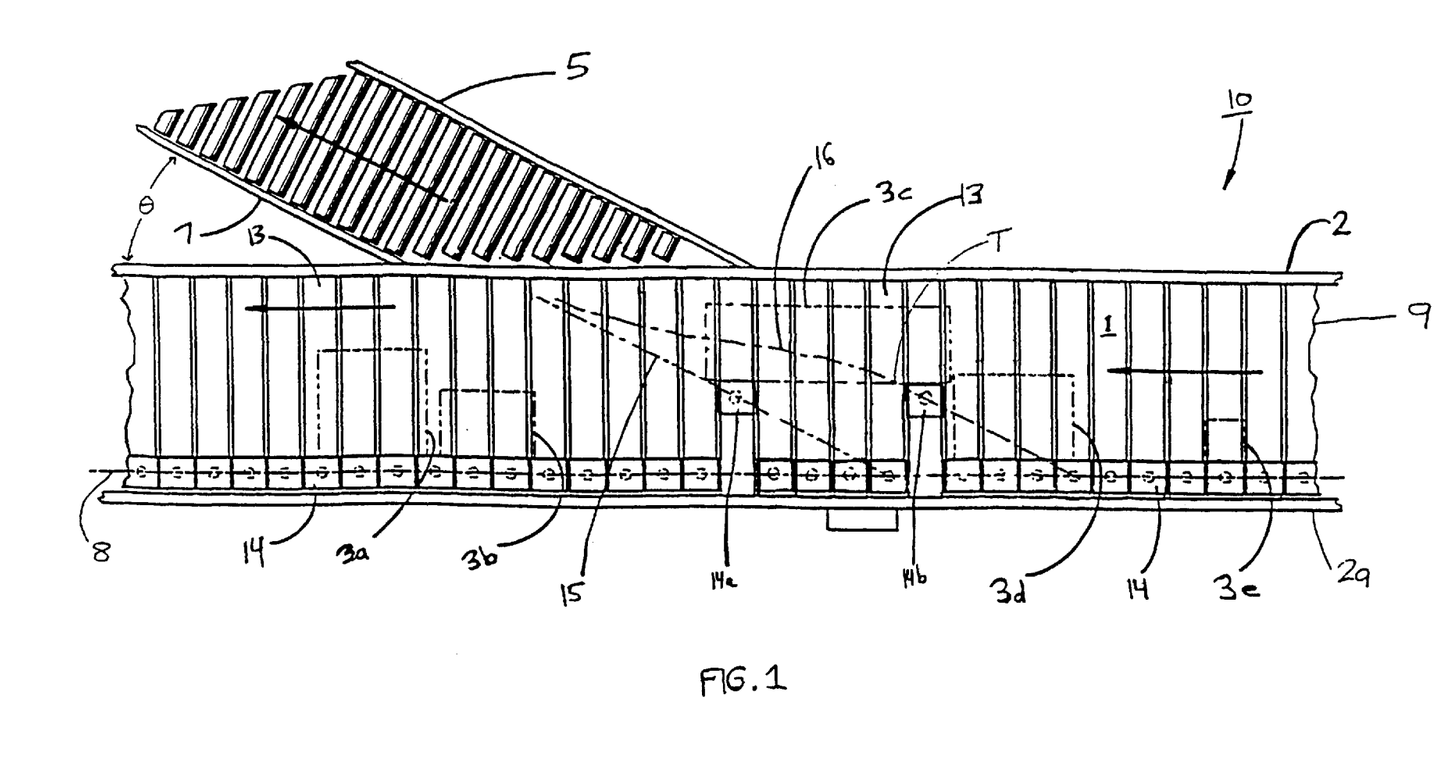
FIG. 1 is a top plan view of a conveying system according to the invention.

Referring specifically to drawings and the illustrative embodiments therein, a conveying system 10 includes a main conveyor 9 and a branch conveyor 5 (FIG. 1). The branch conveyor 5 is positioned adjacent to the main conveyor 9 and at an angle. The arrows illustrate the direction of conveyance for both the main conveyor 9 and the branch conveyor 5.

A conveying surface 1 of main conveyor 9 is defined by a series of surface members 13. The lengthwise direction of the surface members 13 is oriented perpendicular to the direction of movement of the main conveyor 9. Surface members 13 are supported on either side by supporting side rails 2 and 2a. The details of the interconnections of the surface members with each other are disclosed in U.S. Pat. No. 5,127,510, issued to David H. Cotter et al., the disclosure of which is hereby incorporated herein by reference and will not be repeated.

A series of diverting shoes 14 are located along the side of the main conveyor 9 opposite to branch conveyor 5. When the diverting shoes 14 are not being utilized to push an article off the main conveyor onto a branch conveyor, they travel in sequence along the shoe guideway 8 adjacent the longitudinally extending guide track 12b. This guide track 12b prevents the diverting shoes 14 from moving transversely across the conveyor except at the point along the conveyor at which diverting gates 25a–25b are located, or along other similar points where a branch conveyor connects to the main conveyor. Means for returning diverting shoes 14a and 14b to this side of the conveyor are not shown and are not considered part of this invention. Diverting shoe 14b follows the upstream diverting path 16. Diverting shoe 14a follows the downstream diverting path 15.

Figure 2:
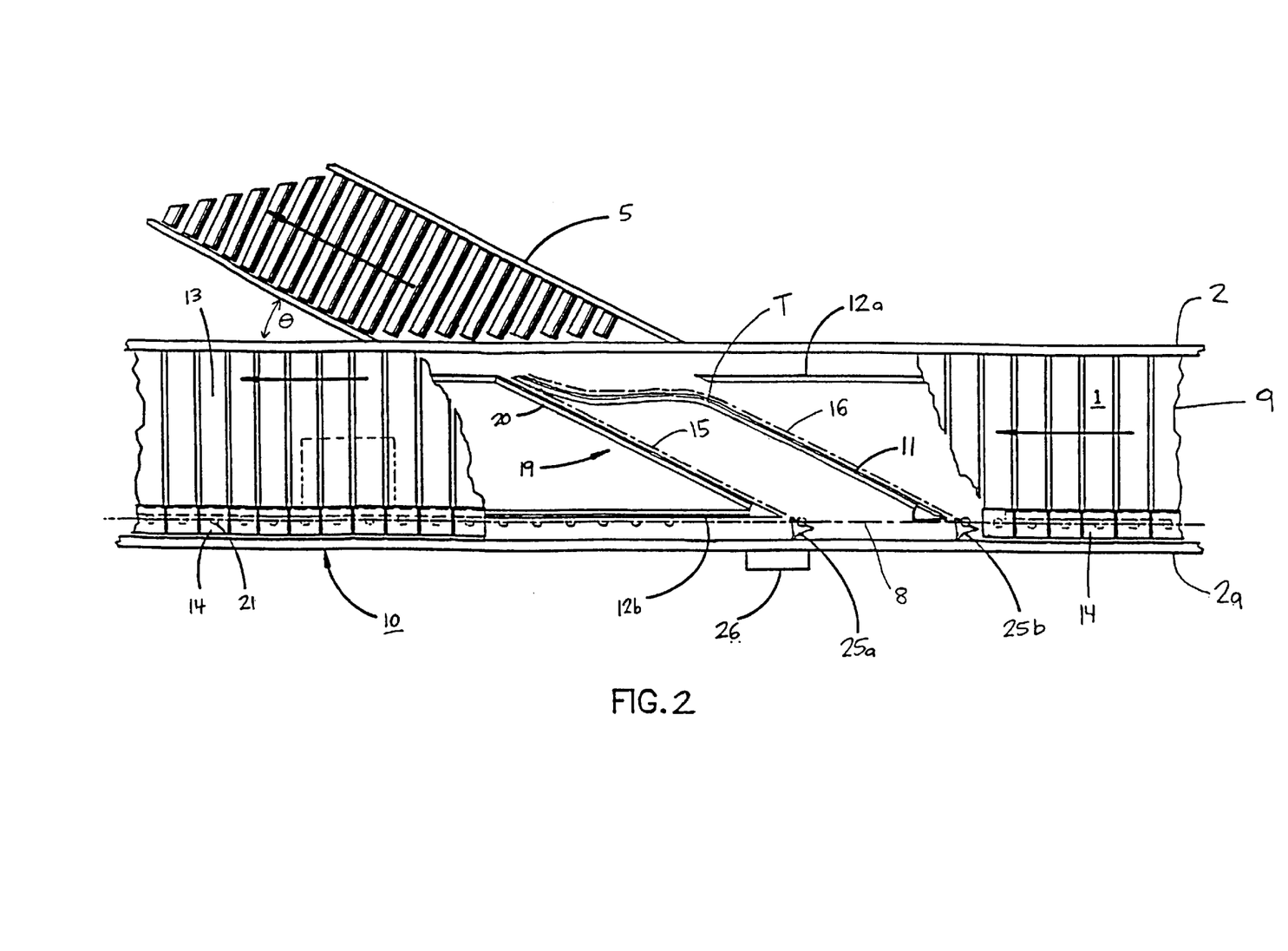
FIG. 2 is a top plan view of the conveying system of FIG. 1 with a center portion removed to illustrate the underlying structure.

A section of the conveying surface 1 has been removed from the center portion of FIG. 2 to illustrate the underlying structure. Diverting gates 25a and 25b can be seen attached along one side of the main conveyor 10 and in the path of diverting shoes 14. Diverting gates 25a and 25b are preferably of the type disclosed in U.S. Pat. No. 5,038,912, the disclosure of which is hereby incorporated herein by reference. Upstream diverting track 11 is parallel with downstream diverting track 20 for a first portion of its length. A second portion of its length curves into and meets downstream diverting track path 15. When diverting gate 25b is activated into a diverting position, diverting shoes are diverted along the curved upstream diverting track 11. When diverting gate 25b is not activated into a diverting position, but, instead, remains in a non-diverting position, the diverting shoes continue to move along the side of the main conveyor until they reach diverting gate 25a. Upon reaching this point, the diverting shoes are either diverted to follow along downstream diverting track 20, or continue to move along the side of the main conveyor 9 in a non-diverting state depending upon whether diverting gate 25a is activated or not.

FIG. 1 illustrates five packages 3a–3e of varying size and shape positioned on main conveyor 9. Package 3c is shown being diverted by diverting shoes 14a and 14b. Diverting shoes 14a and 14b simultaneously contact package 3c generally near either of its ends so that package 3c does not experience any rotational force when initially contacted by shoes 14a and 14b. Package 3d is thus able to follow package 3c with very little separating space. As diverting shoe 14b travels along the upstream diverting track path 16, it moves in a path generally parallel to downstream diverting track path 15. However, when diverting shoe 14b reaches the curved portion of upstream diverting track 11, it begins to follow a curved path merging toward downstream diverting track path 15. As will be discussed further below, the package begins to experience a rotational force after diverting shoe 14b engages the curved portion of upstream diverting track 11.

Figure 3:
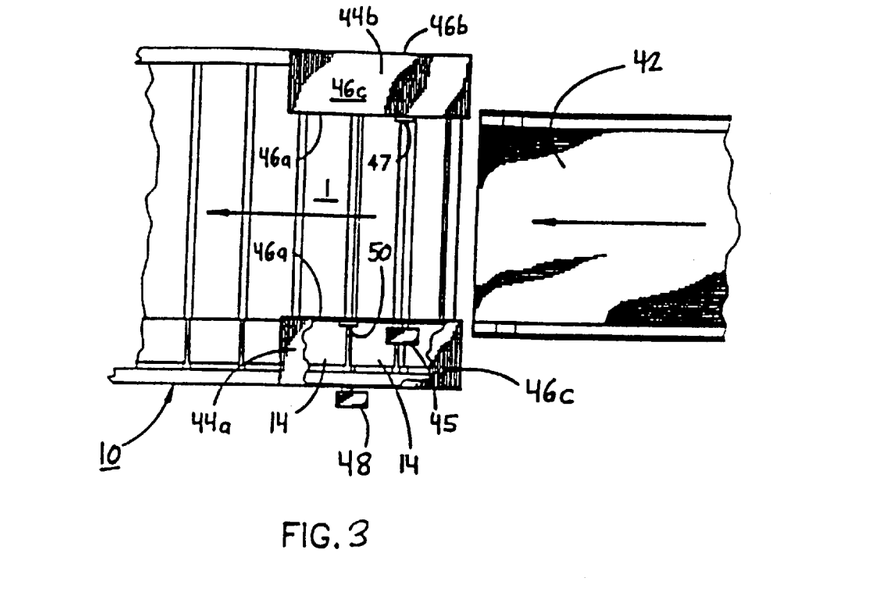
FIG. 3 is a top view of the feed conveyor and the main conveyor.

Conveyor system 10 has a control system 43 which can take a variety of difference forms but which preferably includes substantially the same hardware configuration as disclosed in U.S. Pat. No. 5,165,515 issued to Nitschke et al., the disclosure of which is hereby incorporated herein by reference (FIGS. 3–5) and will not be repeated herein. Suffice it to say, packages are supplied to conveying surface 1 from a slider-bed infeed conveyor 42. Conveying system 10 includes a pair of mounting brackets 44a and 44b adjacent infeed conveyor 42. Each bracket 44a and 44b includes an inner vertical wall 46a and an outer vertical wall 46b which are spanned by a horizontal upper wall 46c. A portion of wall 46c of mounting bracket 44a is removed to reveal structure mounted internally to that mounting bracket. This includes a shoe detector photosensor 48 mounted to wall 46b and a corresponding reflector 50 mounted to the interior of wall 46a of mounting bracket 44a. Additionally, a package detector update photosensor 45 is mounted to wall 46a of bracket 44a and a corresponding reflector 47 is mounted to wall 46a of bracket 44b. With this arrangement, a photobeam generated by photosensor 48 and reflected by reflector 50 is in the path of diverter shoes 14 as conveying surface 1 progressively moves. However, packages on conveying surface 1 do not affect photosensor 48. Another photobeam is generated by update photosensor 45 and reflected by reflector 47. Packages deposited on conveying surface 1 from infeed conveyor 42 interrupt this beam, but it is not affected by the movement of diverter shoes 14.

Figure 4:
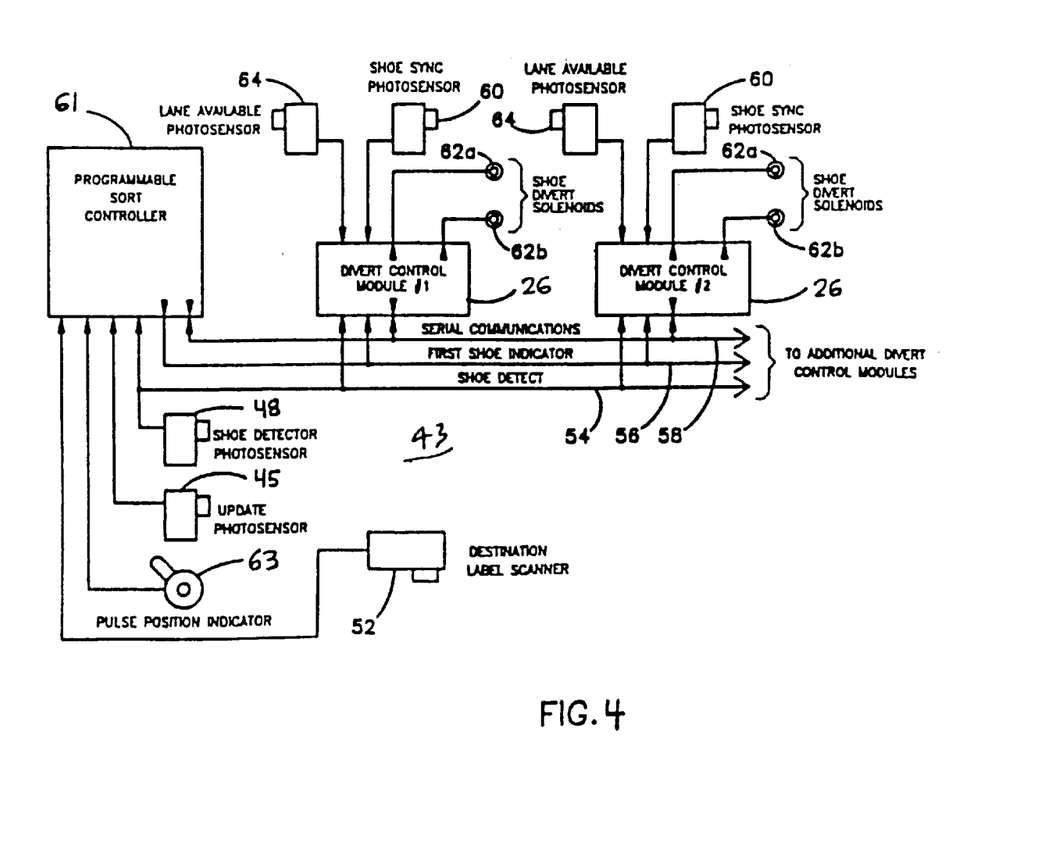
FIG. 4 is a block diagram of the control system.

Photosensors 45 and 48 supply input signals to a central programmable sort controller 61, which can be seen in FIG. 4. Sort controller 61 also receives an input from a pulse position indicator (PPI) 63 that is responsive to the movement of conveying surface 1. PPI 63 provides output pulses that are a function of the incremented movement of the conveying surface 1. Through the use of these three inputs, controller 61 is able to monitor the length, the position, and the movement of the packages. Sort controller 61 also may receive inputs from a destination label scanner 52, which typically will be positioned above infeed conveyor 42 to read and decode standard product bar codes (not shown) printed on the side or top of packages 3. Sort controller 61 is electrically interconnected with each divert control module 26 located alongside main conveyor 9 for each branch conveyor 5. This interconnection includes a shoe detect line 54, a first-shoe indicator line 56, and a two-way serial communication line 58. Lines 54, 56, and 58 are common to all divert control modules 26. In this manner, electrical interconnections along conveying system 10, which may be many tens-of feet long, are greatly simplified.

Each diverter control module 26 receives an input from a shoe-synchronizing photosensor 60. In contrast to the shoe detector photosensor 48 which monitors the leading and trailing edge of each shoe, shoe-sync photosensor 60 responds to the leading edge of the guide pine 21 of the shoe in order to provide precision actuation of the corresponding diverting gates 25a and 25b. Each diverter control module 26 provides outputs to the shoe divert solenoids 62a and 62b, which correspond and operate to diverting gates 25a and 25b. Each diverter control module 26 receives an input from a lane-available photodetector 64 which is a sensing device located along the branch conveyor 5 to provide an indication of whether the branch conveyor has fully accumulated with packages.

In operation, programmable sort controller 61 monitors shoe detector photosensor 48, update photosensor 45, and PPI 63. Each shoe is assigned a unique shoe ID number, which is encoded in system 10 during a calibration mode by a pulsing of the first shoe indicator line 56 once for each passage of the total number of shoes. Once synchronized, the sort controller 61 matches shoes, by ID number, with a package entering system 10, and establishes a data file for the package including its measured length, the first shoe associated with that package and a package identifier to identify the destination branch conveyor to which it is to be sorted. The destination branch conveyor could be manually entered into the system. In a preferred embodiment, however, sort controller 61 is programmed to select the destination branch conveyor in response to the product code on the package read by destination label scanner 52. As each package travels along conveying surface 1 between infeed conveyor 42 and branch conveyors 5, they arrive at a pre-established divert activation point. At this point, the programmable sort controller 61 makes a determination of which shoes, by their unique ID number, will be diverted with the package, or that the package cannot be diverted because the lane-available photo-detector has sensed a back-up in the branch conveyor. In the latter case, no packages will be diverted until the branch conveyor is sensed to have sufficient space available for additional packages.

Figure 5:
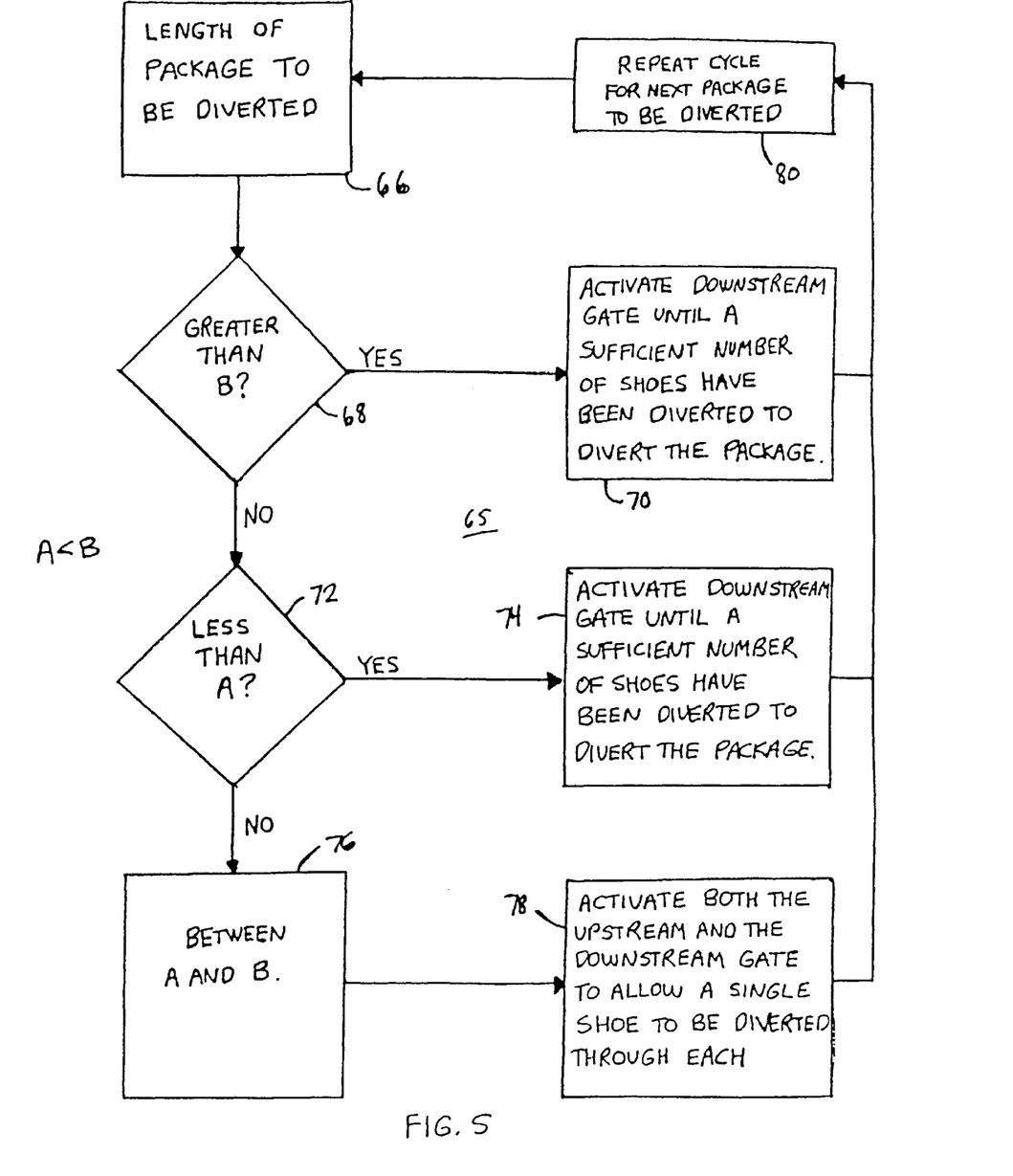
FIG. 5 is a flow chart of a program for controlling a conveyor system according to the invention.

Programmable sort controller 61 includes a control program 65 which uses the input of update photosensor 45 to determine the length of the package at 66. Program 65 compares the length of the package to two predetermined lengths and generates different control outputs accordingly (FIG. 5). If it is determined at 68 that the length of the package to be diverted is greater than a pre-programmed length B, programmable sort controller 61 sends a packet of data over serial communication line 58 to divert control module 26 instructing it to activate downstream diverting gate 25b at 70. It further instructs divert control module 26 to deactivate downstream diverting gate 25b after a sufficient number of diverting shoes have been diverted. If it is determined at 68 that the length of the package to be diverted is less than B, it is then determined at 72 whether the measured packaged length is less than A. Length A is less than length B and approximately equal to the separation distance between diverting gates 25a and 25b. If the package length is determined at 72 to be less than A, then the programmable sort controller 61 sends a packet of data over communication line 58 to divert control module 26 instructing it to activate downstream diverting gate 25b at 74. It further instructs divert control module 26 to deactivate downstream diverting gate 25b after a sufficient number of diverting shoes have been diverted. If it is determined at 72 that the package is greater than A, then it is concluded at 76 that the package length is between A and B. Programmable sort controller 61 then sends a packet of data over serial communication line 58 to divert control module 26 instructing it to activate both the upstream and downstream diverting gates 25a, 25b at 78. The data packet further instructs divert control module 26 to deactivate diverting gates 25a and 25b after a single diverting shoe has passed through each. At 80, program 65 repeats this process for the next package to be diverted.

Figure 6A:
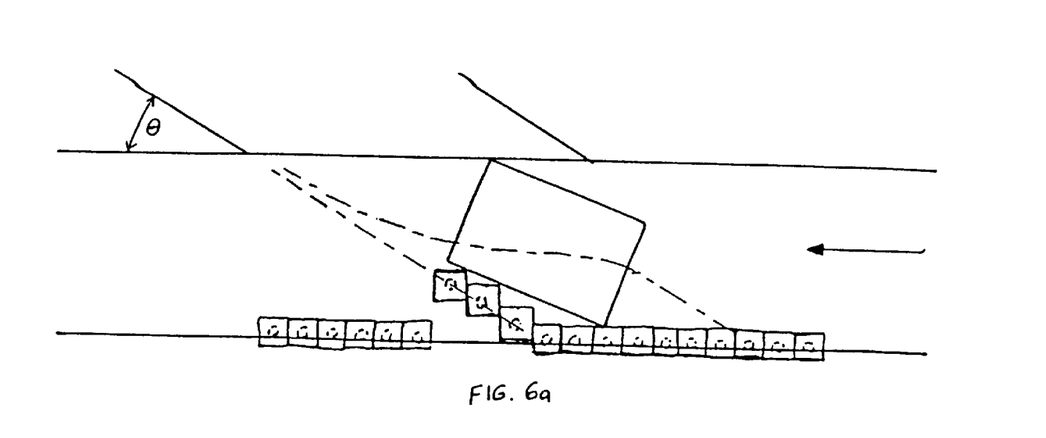
FIGS. 6(a)–(c) are plan view diagrams illustrating the operation of a conveyor according to the invention.
Figure 6B:
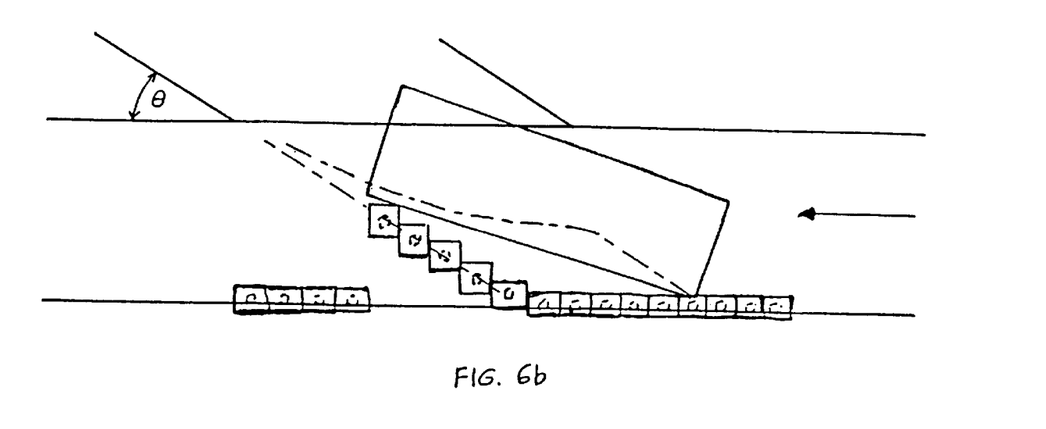
Figure 6C:
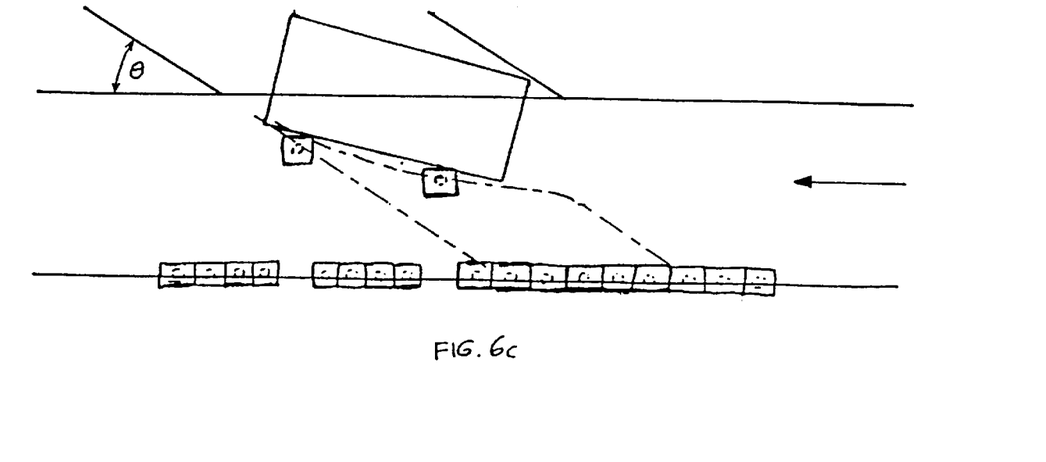

FIGS. 6a–6c illustrate various package sizes being diverted. In FIG. 6a, a package of length less than pre-programmed length A is being diverted. Only the downstream diverting gate 25a is activated and as many diverting shoes as is necessary to divert the package are being diverted. This diverting corresponds with step 74 in FIG. 5. In FIG. 6b, a package of greater length than pre-programmed length B is being diverted. Similarly, only downstream diverting gate 25a is activated and as many diverting shoes as is necessary to divert the package are being diverted. This diverting corresponds with step 70 in FIG. 5. In FIG. 6c, a package of length between pre-programmed lengths A and B is being diverted. Only a single diverting shoe has been diverted along each diverting track. This diverting corresponds with step 78 in FIG. 5.

Figure 7:
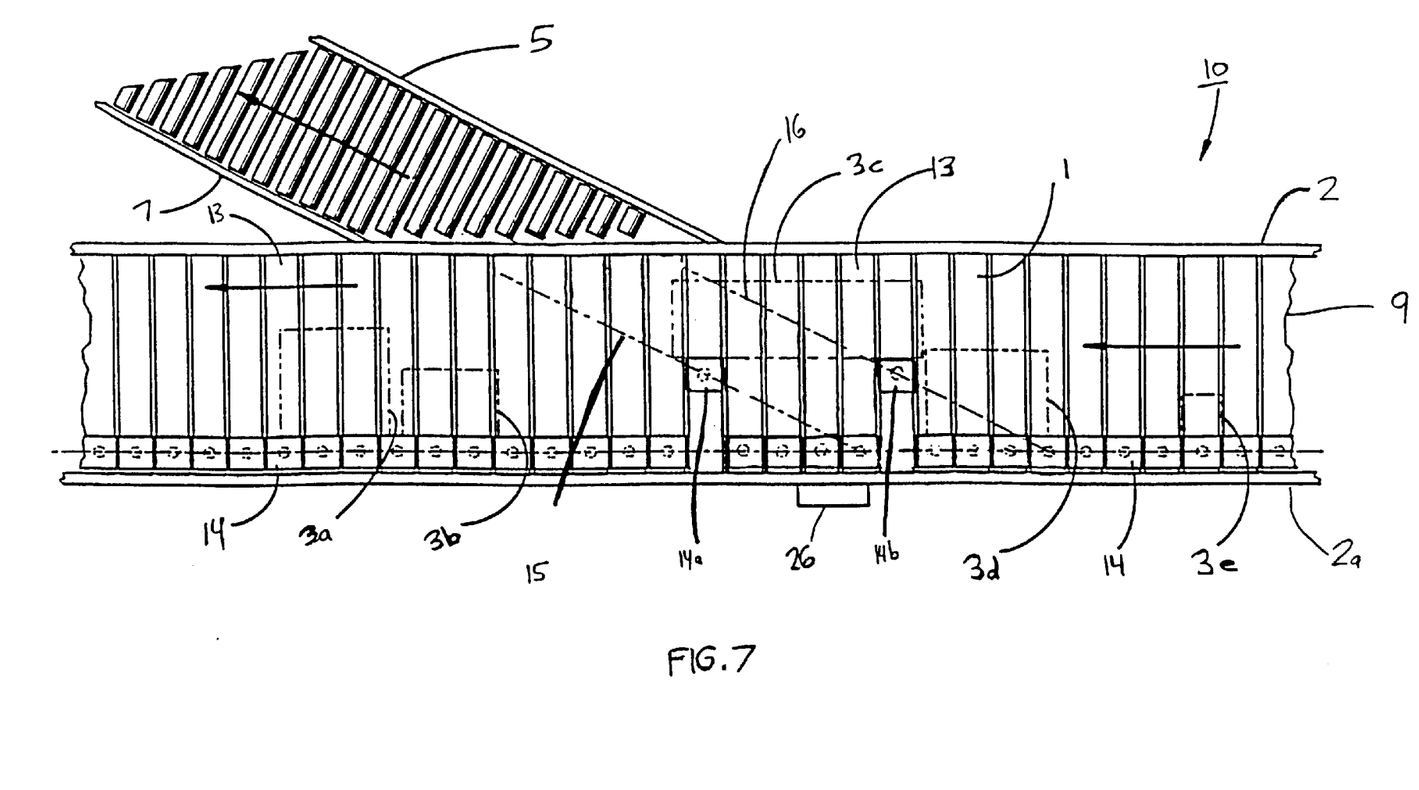
FIG. 7 is a top plan view of an alternate embodiment of the invention.
Figure 8:
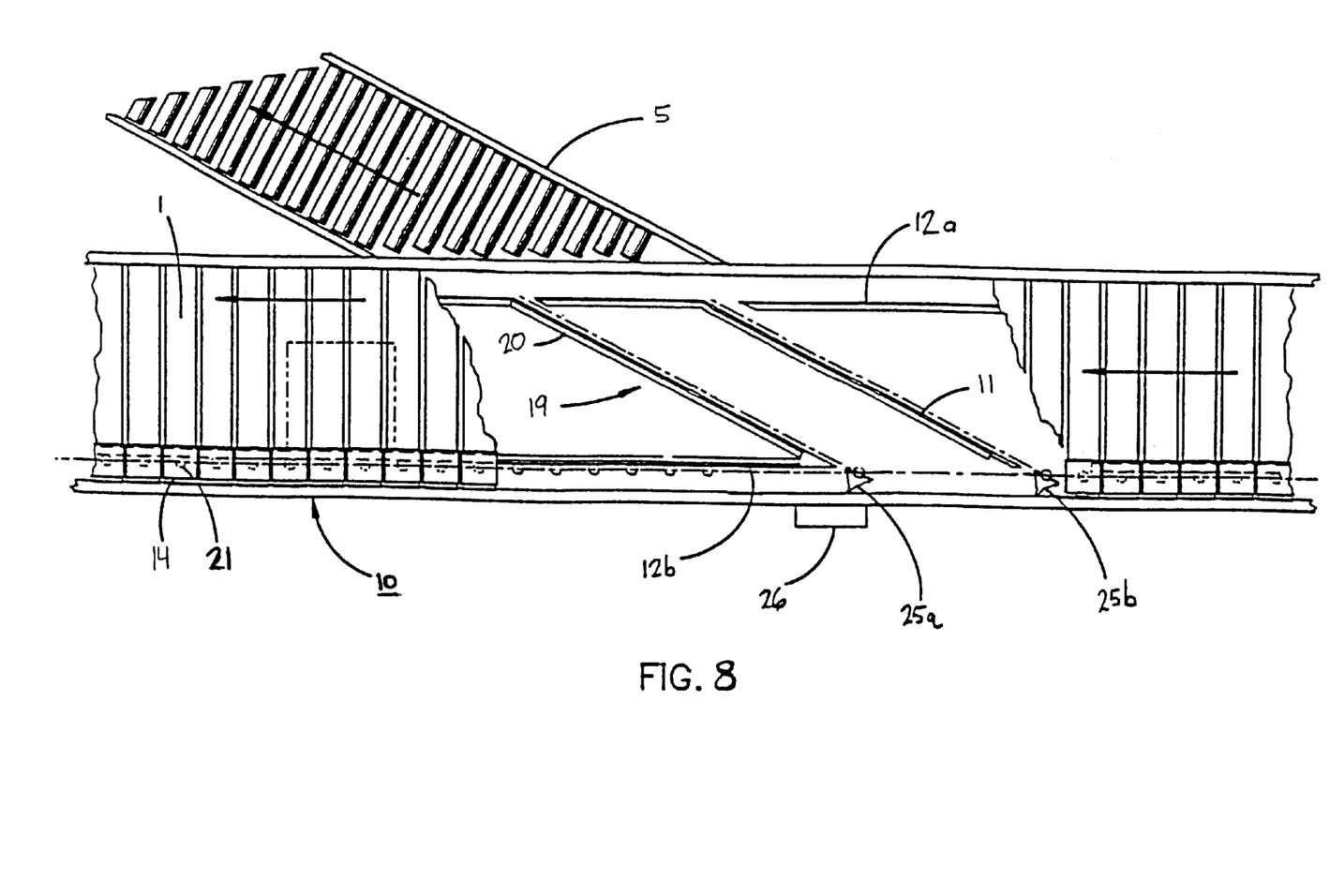
FIG. 8 is a top plan view of the conveying system of FIG. 7 with a center portion removed to illustrate the underlying structure.

FIGS. 7 and 8 illustrate an alternative embodiment of the present invention using the above-described control logic. This alternate embodiment does not involve an upstream diverting track converging with a downstream diverting track, as is present in other embodiments of the invention. Because the diverting tracks are parallel fully across the converging surface, mid-length packages, which are diverted with one shoe on each track, will not be rotated prior to being discharged to the branch conveyor. In FIG. 7, a package 3c of length between pre-programmed lengths A and B is shown being diverted. Only diverting shoes 14a and 14b have been diverted.

Figure 9:
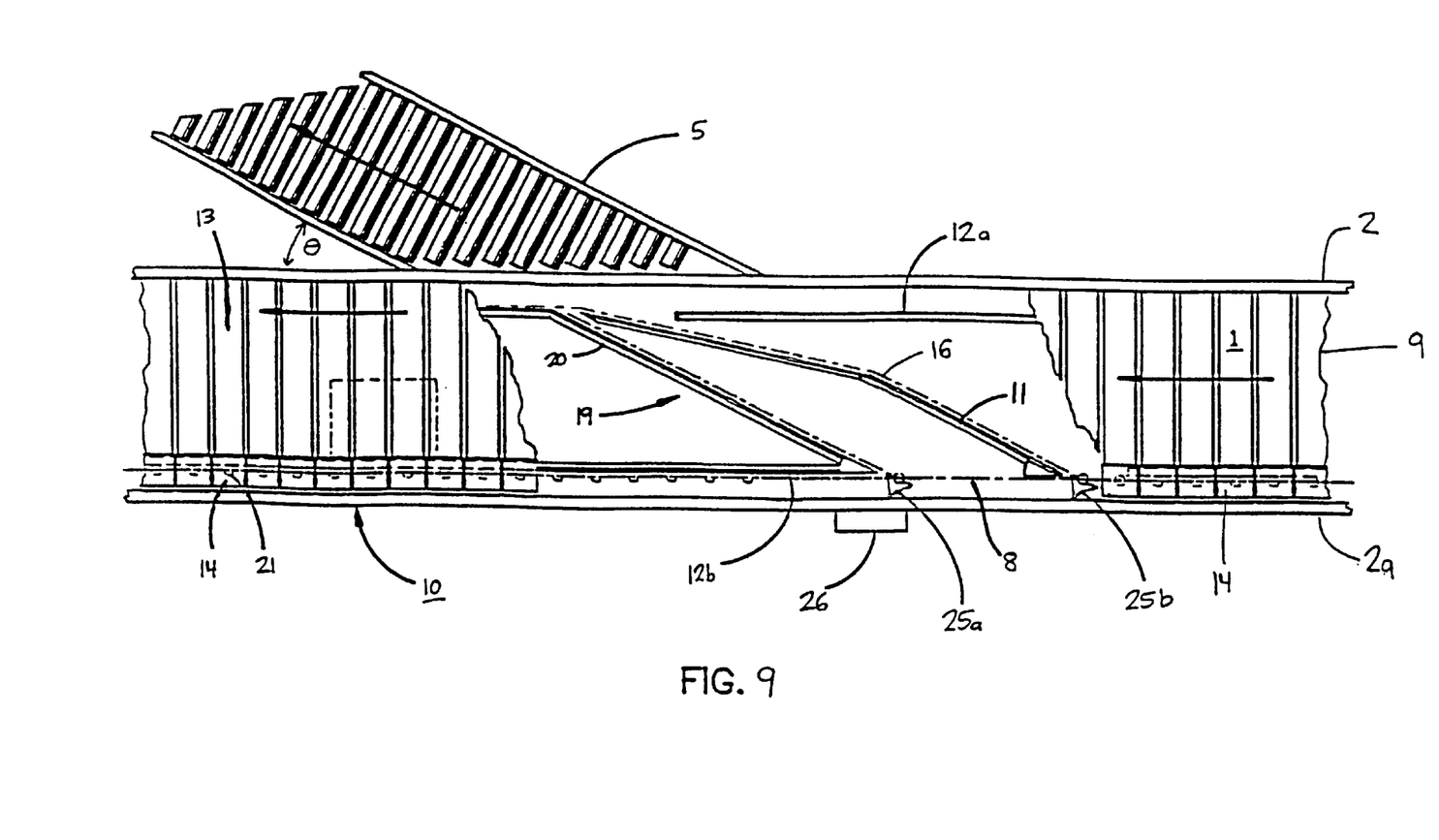
FIG. 9 is a top plan view of an alternate embodiment of the invention with a center portion removed to illustrate the bent upstream diverting track.
Figure 10:
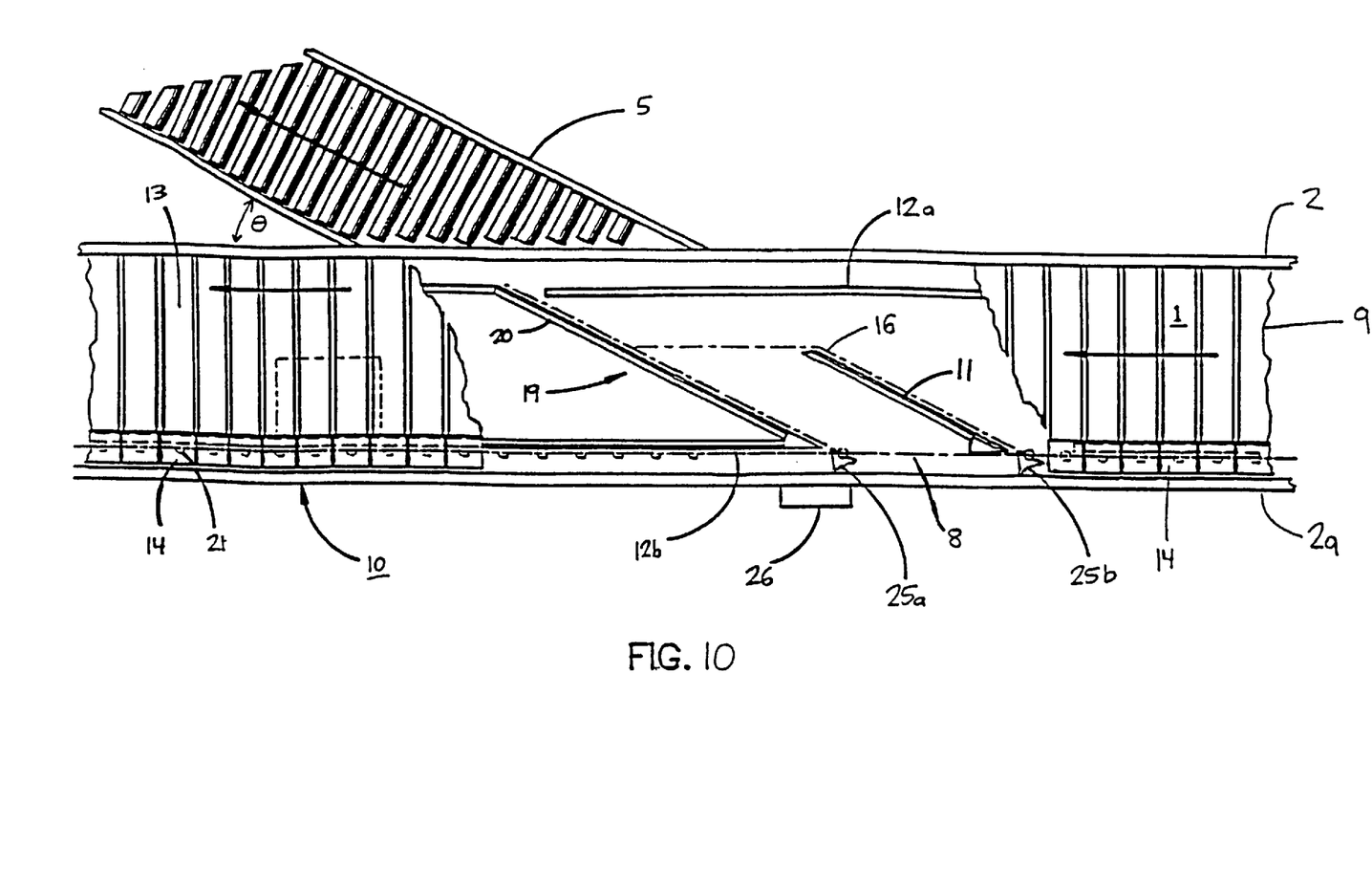
FIG. 10 is a top plan view of an alternate embodiment of the invention with a center portion removed to illustrate the terminated upstream diverting track.

Another alternative embodiment of the present invention is shown in FIGS. 9 and 10, where a middle portion of the conveyor has, again, been removed to show the underlying structure. In FIG. 9, upstream diverting track 11 is bent at an angle instead of being curved as in other embodiments. The bent portion meets with downstream diverting track 20. The use of a bent upstream diverting track is simpler to manufacture than a curved track, while it still causes rotation of the package being diverted, after a delay. Indeed, the bent upstream diverting track can be made of two straight pieces of track appropriately fastened together. In FIG. 10, upstream diverting track 11 terminates near the middle of the conveyor 9. This embodiment also creates a rotation of the package to be diverted, after a delay. In both of these embodiments, the delay is equal to the time it takes for upstream diverting shoe 14b to travel the length of the portion of upstream diverting track 11 that is generally parallel to downstream diverting track 20.

Figure 11:
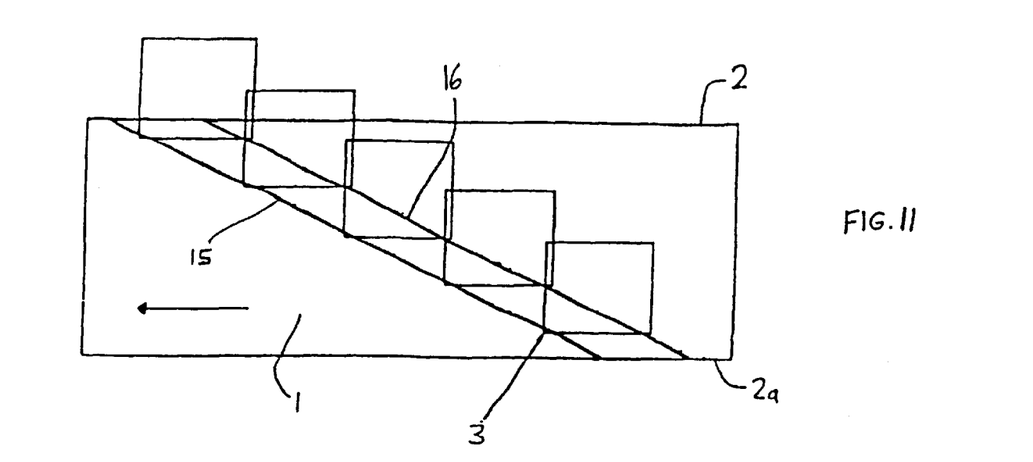
FIG. 11 is a diagram of the embodiment of the invention shown in FIGS. 7 and 8 illustrating a single package in various stages of divert.
Figure 12:
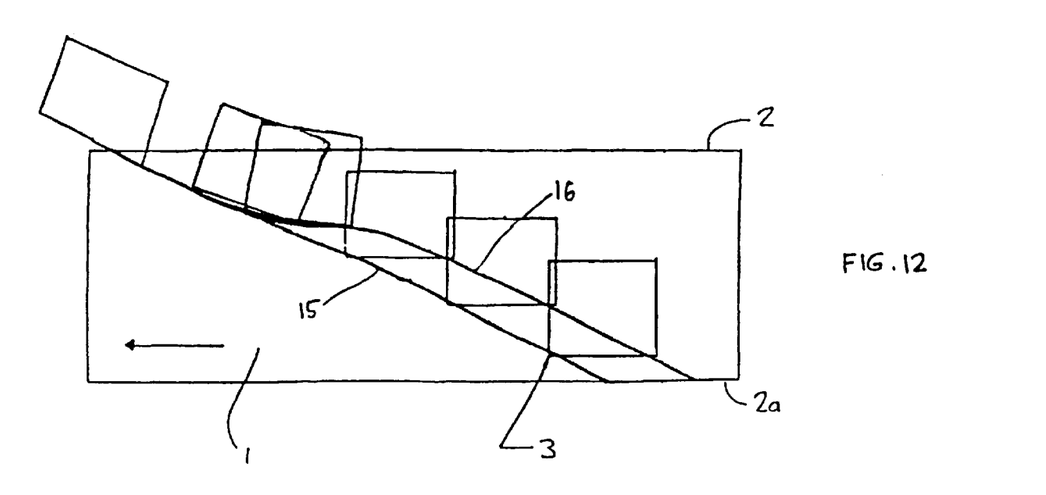
FIG. 12 is a diagram of the embodiment of the invention shown in FIGS. 1 and 2 illustrating a single package in various stages of divert.

FIG. 11 illustrates a single package 3 in various stages of being diverted according to one embodiment of the invention. In this embodiment, the package remains oriented generally parallel to the direction of motion of the main conveyor. FIG. 12 illustrates a single package 3 in another embodiment of the invention. In this embodiment, the package 3 remains oriented generally parallel to the direction of motion of the main conveyor, but is rotated after being partially diverted.

Having described the invention in connection with certain specific embodiments thereof, it is to be understood that the description is meant to be interpreted as illustrative only, and that various modifications may also be made by those skilled in the art without departing from the spirit and scope of the invention as expressed in the accompanying claims.

The embodiment of the invention in which an exclusive property or privilege is claimed are defined as follows:

1. In a conveyor having a longitudinally moving conveying surface defined by a plurality of interconnected generally parallel track surface members connected in spaced relation with each other in an endless web, a plurality of diverter shoes each movably mounted on one of said track surface members for lateral movement with respect to said conveying surface, a diverting system comprising:

guide pins descending from each of said diverter shoes;

a guideway located along a side of said conveyor adapted for receiving said pins and guiding said shoes as they travel with and along a side of said conveying surface;

a pair of diverting tracks adapted to guide said guide pins and located under said conveying surface, said diverting tracks oriented at an angle to said guideway and extending to the other side of said conveyor;

a pair of activatable diverting gates connecting said guideway to said diverting tracks, said diverting gates capable of being in either a diverting state where diverting shoes are diverted from said guideway into said diverting tracks, or in a non-diverting state where said diverting shoes continue to move along said guideway;

sensors located alongside said conveying surface for determining the length of articles conveyed on said conveying surface; and a controller connected to said sensor, said controller activating both of said pair of said diverting gates when the length of said article is greater than a first predetermined length and less than a second predetermined length, and activating only a single one of said connecting gates when said length of said article is less than said first predetermined length or greater than said second predetermined length.

2. The diverting system of claim 1 wherein said pair of diverting tracks are aligned parallel to each other on the side of said conveying surface nearest to said diverting gates, but meet on the side of said conveying surface opposite to said diverting gates.

3. The diverting system of claim 1 wherein when both of said diverting gates are activated, both of said diverting gates are returned to said non-diverting state after a single diverting shoe has been diverted.

4. The diverting system of claim 1 wherein when only one of said diverting gates is activated, said activated diverting gate remains in said diverting state until a sufficient number of diverting shoes have been diverted to divert said article.

5. A method for diverting articles from a conveyor having a conveying surface defined by a series of laterally extending parallel surface members traveling in a longitudinal direction and a plurality of pushers laterally moveable on said surface members comprising the steps of:

applying a force purely perpendicular to said direction of conveyor motion to the article by engaging the article with two of said pushers;

continuing to apply said perpendicular force to said article for a predetermined period of time; and after said predetermined period of time, altering said perpendicular force to include a rotational force component along with said perpendicular force.

6. The method of claim 5 further including terminating said rotation force after said article has been rotated a desired amount.

7. The method of claim 6 wherein said desired amount is equal to the angle formed by the intersection of said conveyor with an attached branch conveyor which receives said articles.

8. The method of claim 5 wherein said step of applying said perpendicular force is accomplished by said pushers engaging a pair of diverting tracks located underneath said conveying surface, said diverting tracks being oriented parallel to each other for a predetermined portion of their length and non-parallel to each other for the remaining portion of their length.

9. The method of claim 8 wherein said pair of diverting tracks is defined by an upstream diverting track and a downstream diverting track, said downstream track being straight for its entire length, and said upstream track having a first straight portion and a second portion, said second portion not straightly aligned with said first portion.

10. The method of claim 8 wherein said pair of diverting tracks is defined by an upstream diverting track and a downstream diverting track, said upstream track being a shorter length than said downstream diverting track.

11. A method for diverting articles from a conveyor having a conveying surface defined by a series of laterally extending parallel surface members traveling in a longitudinal direction and a plurality of pushers laterally moveable on said surface members comprising the steps of:

measuring the length of the article to be diverted;

comparing the length of the article to be diverted with a first and second predetermined length, said second predetermined length being greater than said first predetermined length;

applying a perpendicular force and a rotational force to the article by engaging the article with at least one pusher if said article is less than said first predetermined length or greater than said second predetermined force; and applying a force solely perpendicular to said direction of conveyor motion to the article by engaging the article with two of said pushers if said article is between said first predetermined length and said second predetermined length.

12. The method of claim 11 further comprising the steps of:

continuing to apply said solely perpendicular force to said article when said article is between said first and said second predetermined lengths for a predetermined period of time; and altering said solely perpendicular force to include a rotational force component along with said perpendicular force, said rotational force component rotating said article to a desired orientation.

13. A conveyor diverting system comprising:

a main conveyor moving in a particular direction;

at least one branch conveyor coupled to said main conveyor such that articles traveling on said main conveyor can be diverted onto said at least one branch conveyor;

a plurality of diver shoes movably mounted on said main conveyor, said diverting shoes movable in a direction generally transverse to the direction of motion of said main conveyor;

a diverting system that selectively moves at least one of said diverting shoes for diverting an article from said main conveyor to said at least one branch conveyor; and said diverting system adapted to move at least one of said diverting shoes in a manner such that said article initially moves an initial distance in an orientation parallel to said main conveyor and subsequently moves a distance during which said article is rotated.

14. The conveyor diverting system of claim 13 wherein said diverting system includes an upstream and a downstream diverting track.

15. The conveyor diverting system of claim 14 wherein upstream diverting track has a straight portion and a curved portion.

16. The conveyor diverting system of claim 14 wherein said upstream diverting track is comprised of two portions meeting at an angle, one of said portions oriented parallel to said downstream diverting track, and the other of said portions converging with said downstream diverting track.

17. A conveyor diverting system comprising:

an array of movable surface members defining a conveying surface, said conveying surface further defining two sides;

diverting shoes mounted on said surface members and adapted to move transversely across said conveying surface from one of said sides to the other of said sides;

a guide pin extending from below each of said diverting shoes;

a guide track disposed below said array of movable surface member, said guide track adapted to guide said guide pins;

upstream and downstream shoe diverters positioned along and interrupting said guide track, said shoe diverters assuming one of a non-diverting state in which guide pins are guided by said guide track and a diverting state in which said guide pins are diverted from said guide track; and an upstream and a downstream diverting track positioned underneath said conveying surface and aligned with said upstream and downstream shoe diverters, respectively, said upstream and downstream diverting tracks configured to initially divert articles in an orientation parallel to the direction of movement of said conveying surface and subsequently to rotate the articles being diverted.

18. The conveyor system of claim 17 wherein said upstream diverting track has a straight portion and a curved portion.

19. The conveyor system of claim 17 wherein said upstream diverting track is comprised of two portions meeting at an angle one of said portions oriented parallel to said downstream track, and the other of said portions converging with said downstream diverting track.

20. The conveyor system of claim 17 further comprising:

at least one sensor located along said conveying surface and a controller;

said at least one sensor connected to said controller and providing readings used by said controller to determine the length of an article on said conveying surface; and said controller connected to said shoe diverters, said controller activating both said shoe diverters when said controller determines that an article is greater than a first predetermined length and less than a second predetermined length that is greater than said first predetermined length, said controller activating only said downstream diverter when said controller determines that the article is less said first predetermined length or is greater than said second predetermined length.

21. A conveyor diverting system comprising:

a main conveyor moving in a particular direction;

at least one branch conveyor coupled to said main conveyor such that articles traveling on said main conveyor can be diverted onto said at least one branch conveyor;

a plurality of divert shoes movably mounted on said main conveyor, said diverting shoes movable in a direction generally transverse to the direction of motion of said main conveyor;

a plurality of shoe diverts capable of being in either a diverting state wherein diverting shoes are diverted transversely across said main conveyor or a non-diverting state wherein diverting shoes are not diverted transversely across said main conveyor;

a control system that activates at least two of said plurality of shoe diverters into a diverting state when an article to be diverted is greater than a first predetermined length and less than a second predetermined length, and activates only a single one of said shoe diverters into a diverting state when said article to be diverted is less than said first predetermined length or greater than said second predetermined length.

22. The conveyor diverting system of claim 21 wherein said control system includes diverting tracks adapted to divert an article across said conveyor initially without rotation of the article and subsequently with rotation of the article when at least two of said shoe diverters are activated into the diverting state.

23. The conveyor diverting system of claim 21 wherein when only one of said shoe diverters is activated into said diverting state, said activated diverting gate remains in said diverting state until a sufficient number of diverting shoes have been diverted to divert said article.

24. The conveyor diverting system of claim 21 wherein when both of said shoe diverters are activated into said diverting state, both of said shoe diverters are returned to said non-diverting state after a single diverting shoe has been diverted by each said shoe diverter.

25. A method for diverting articles from a conveyor having a conveying surface defined by a series of laterally extending parallel surface members traveling in a longitudinal direction and a plurality of pushers laterally moveable on said surface members comprising:

applying a perpendicular force component that is substantially perpendicular to the direction of conveyor motion to an article by engaging the article with at least two of said pushers during an initial portion of a diverting motion; and altering said perpendicular force component by including a rotational force component with said substantially perpendicular component during a subsequent portion of the diverting motion.

26. The method of claim 25 wherein the applying a perpendicular force component includes moving at least two diverting shoes across said main conveyor.

27. The method of claim 25 further including terminating said rotational force component after the article has been rotated a desired amounted.

28. The method of claim 27 wherein said desired amount of rotation is substantially equal to the angle formed by the intersection of said main conveyor and said branch conveyor.

29. A method of diverting articles from a main conveyor onto a branch conveyor comprising:

providing a plurality of movable pushers which are movable across said main conveyor;

providing a plurality of diverters which cause said pushers to move across said main conveyor when said diverters are activated to a diverting state;

measuring the length of the article to be diverted;

activating at least two of said plurality of diverters when the length of said articles is greater than a first predetermined length and less than a second predetermined length; and activating only one of said plurality of diverters when the length of said article is less than said first predetermined length or greater than said second predetermined length.

30. The method of claim 29 wherein said activating of at least two of said plurality of diverters occurs only long enough to allow a single pusher to be diverted by each of said diverters.

31. The method of claim 30 wherein said activating of only a single one of said plurality of diverting gates occurs long enough to allow sufficient pushers to be diverted for diverting the article onto the branch conveyor.

* * * * *